US011535333B2

(12) United States Patent
Benkert et al.

(10) Patent No.: US 11,535,333 B2
(45) Date of Patent: Dec. 27, 2022

(54) MEANS FOR OPERATING A MOTORCYCLE, SYSTEM AND METHOD FOR OPERATING A MOTORCYCLE

(71) Applicant: Vitesco Technologies GmbH, Hannover (DE)

(72) Inventors: Maximilian Benkert, Munich (DE); Egor Sawazki, Munich (DE)

(73) Assignee: Vitesco Technologies GmbH

( * ) Notice: Subject to any disclaimer, the term of this patent is extended or adjusted under 35 U.S.C. 154(b) by 323 days.

(21) Appl. No.: 16/768,375

(22) PCT Filed: Nov. 29, 2018

(86) PCT No.: PCT/EP2018/082967
§ 371 (c)(1),
(2) Date: May 29, 2020

(87) PCT Pub. No.: WO2019/106073
PCT Pub. Date: Jun. 6, 2019

(65) Prior Publication Data
US 2020/0385082 A1 Dec. 10, 2020

(30) Foreign Application Priority Data
Dec. 1, 2017 (DE) ...................... 10 2017 221 642.5

(51) Int. Cl.
*B62K 21/26* (2006.01)
*B62J 45/42* (2020.01)
(Continued)

(52) U.S. Cl.
CPC ............. *B62K 21/26* (2013.01); *B60W 10/20* (2013.01); *B62J 45/42* (2020.02); *B60W 30/09* (2013.01);
(Continued)

(58) Field of Classification Search
CPC ........ B62K 21/00; B62K 11/14; B62K 11/00; B62K 23/02; B60W 10/20
See application file for complete search history.

(56) References Cited

U.S. PATENT DOCUMENTS 8,606,464 B2 12/2013 Suzuki
2004/0035630 A1* 2/2004 Lich .................. B60R 21/01516
701/45
(Continued)

FOREIGN PATENT DOCUMENTS

CN 1693106 A * 11/2005
DE 10223368 A 12/2003
(Continued)

OTHER PUBLICATIONS

Alfred Kuttenberger, Method for Performing a Driver-Independent Driver Assistance Function in a Two-Track Motor Vehicle, Mar. 16, 2017, EPO, WO 2017-041944 A1, English Abstract (Year: 2017).*
(Continued)

*Primary Examiner* — James A English
(74) *Attorney, Agent, or Firm* — RatnerPrestia

(57) ABSTRACT

A device for operating a motorcycle includes a steering device with a first and a second grip element, and includes a sensor system for detecting a riding situation. The sensor system includes a grip sensor which is arranged in or on one of the grip elements and which is designed to, in an operating state of the operating device, detect external contact on the respective grip element and generate an associated grip measurement signal. The operating device furthermore includes a steering actuator which is coupled to the steering device for the purposes of setting a steering angle with respect to a steering axis, such that, in a manner dependent on the riding situation and the grip measurement
(Continued)

signal, a predetermined steering angle can be set at the steering device by way of the steering actuator.

14 Claims, 4 Drawing Sheets

(51) Int. Cl.
*B60W 10/20* (2006.01)
*B60W 30/10* (2006.01)
*B60W 30/09* (2012.01)
*B62D 1/02* (2006.01)
*B62D 6/00* (2006.01)
*B62K 11/00* (2006.01)
*B62K 23/02* (2006.01)

(52) U.S. Cl.
CPC .............. *B60W 30/10* (2013.01); *B62D 1/02* (2013.01); *B62D 6/00* (2013.01); *B62K 11/00* (2013.01); *B62K 23/02* (2013.01)

(56) References Cited

U.S. PATENT DOCUMENTS

| | | | |
|---|---|---|---|
| 2064/0035630 | | 2/2004 | Lich et al. |
| 2009/0198411 | A1* | 8/2009 | Kohls .................... F16F 9/145 180/280 |
| 2015/0203110 | A1* | 7/2015 | Moerbe ................ B60T 8/1706 701/72 |
| 2017/0057542 | A1* | 3/2017 | Kim ...................... B60W 10/20 |
| 2019/0077396 | A1* | 3/2019 | Kuttenberger ........ B60W 10/18 |
| 2020/0130771 | A1* | 4/2020 | Jacobsz Rosier ........ B62J 45/20 |

FOREIGN PATENT DOCUMENTS

| | | |
|---|---|---|
| DE | 102007081114 A1 | 6/2009 |
| DE | 102008659115 A1 | 7/2009 |
| DE | 102013214517 A1 | 1/2015 |
| DE | 102015217257 A1 | 3/2017 |
| DE | 102015220901 A1 | 4/2017 |
| EP | 2436588 A1 | 4/2012 |
| JP | 2017208168 A1 | 11/2017 |
| WO | WO-2017041944 A1 * | 3/2017 |

OTHER PUBLICATIONS

Alfred Kuttenberger, Method for Performing a Driver-Independent Driver Assistance Function in a Two-Track Motor Vehicle, Mar. 16, 2017, EPO, WO 2017-041944 A1, Machine Translation of Description (Year: 2017).*

Hongqi Liu, Safety apparatus for monitoring and controlling driving of motor vehicle, Nov. 9, 2005, EPO, CN 1693106 A, Machine Translation of Description (Year: 2005).*

German Examination Report for German Application No. 10 2017 221 642.5, dated Jul. 17, 2018, 5 pages.

International Search Report and Written Opinion for International Application No. PCT/EP2018/082967, dated Feb. 22, 2019, with partial translation, 7 pages.

International Search Report and Written Opinion for International Application No. PCT/EP2018/082967, dated Feb. 22, 2019, 12 pages (German).

* cited by examiner

MEANS FOR OPERATING A MOTORCYCLE, SYSTEM AND METHOD FOR OPERATING A MOTORCYCLE

CROSS REFERENCE TO RELATED APPLICATIONS

This application is the U.S. National Phase Application of PCT International Application No. PCT/EP2018/082967, filed Nov. 29, 2018, which claims priority to German Patent Application No. 10 2017 221 642.5, filed Dec. 1, 2017, the contents of such applications being incorporated by reference herein.

FIELD OF THE INVENTION

The invention relates to a means and method for operating a motorcycle, which can each contribute to reliable and safe operation and to increased comfort of the motorcycle. The invention also relates to a system having a motorcycle.

BACKGROUND OF THE INVENTION

Motorcycles generally have a steering device with a handlebar, which must be held during a riding cycle. In particular on relatively long journeys, such a steering task is perceived as strenuous by the riders of motorcycles and can cause numbness in the hands. In addition, gripping contact on a handlebar of the motorcycle usually requires a bent-over sitting position, which in turn can cause pain in the rider's back and can limit the rider's ability to concentrate.

SUMMARY OF THE INVENTION

An aspect of the invention is a means and method for operating a motorcycle, which can each contribute to reliable and safe operation and to increased comfort of the motorcycle.

According to one aspect of the invention, a means for operating a motorcycle comprises a steering device with a first and a second grip element, and comprises a sensor system for detecting a riding situation, which sensor system comprises a grip sensor which is arranged in or on one of the grip elements. The grip sensor is designed to, in an operating state of the means, detect external contact on the respective grip element and generate an associated grip measurement signal. The means furthermore comprises a steering actuator which is coupled to the steering device for the purposes of setting a steering angle with respect to a steering axis, such that, in a manner dependent on the riding situation and the grip measurement signal, a predetermined steering angle can be set at the steering device by way of the steering actuator.

With the described means, a steering system for a motorcycle can be realized which permits safe and reliable operation of the motorcycle and can furthermore contribute to increased comfort of the motorcycle. Such a steering system is based on a sensor detection at the handlebar or at the steering device, and is activated as a result of the steering device being released by a rider and there thus no longer being gripping contact on the respective grip element that has the grip sensor. It is preferable for both grip elements of the steering device to have in each case one grip sensor, the measurement signal of which is jointly processed for the activation of the steering system. The means thus allows the one or more grip elements of the steering device of a motorcycle to be released, while at the same time permitting safe and controllable onward travel of the motorcycle.

The activated steering actuator actively applies a predefined steering moment with respect to the steering axis of the steering device and thus permits active steering or control of the steering device by setting of a predefined steering angle. The steering actuator may for example be designed as an electromechanical actuator, wherein a required energy supply is preferably implemented via the vehicle electrical system of an associated motorcycle.

One grip element, for example that which realizes the throttle grip, or both grip elements are each equipped with a grip sensor. If it is determined by means of the grip sensor or the grip sensors of the means that at least one hand of a rider is resting on the steering device, no predefining of a steering angle at the steering device is performed. Such a situation represents, for example, a passive operating state or rest state of the means. If the steering device is released, such that contact can no longer be determined by means of the one or more grip sensors, then the means switches to an active operating state, in which a steering angle is predefined in a controlled manner by means of the steering actuator, for example in order to maintain the steering direction or set a targeted change in the steering direction.

Such predefining of the steering direction, which can be set by means of the steering angle, is thus performed in a controlled manner depending on the grip measurement signal and the riding situation, such that the rider can safely relax their hands and change their sitting position. The described means therefore makes it possible to counteract numbness in the hands and pain owing to a sitting posture having been assumed for a long period of time, and can thus contribute to comfortable riding and increased comfort of the motorcycle.

A present and predicted riding situation is determined, for example, on the basis of further sensors, such that, for example, a steering angle of zero degrees is predefined in the case of a straight route section in order to maintain the direction of travel in a stable manner. However, even on a straight route section, a correction of the direction of travel may be required to a certain extent, such that, for example, a small steering angle of plus one or two degrees is specified, whereupon the riding situation and direction of travel are determined again and then, for example, a steering angle of minus one or two degrees is set in a predefined manner at the steering device. The riding situation is determined, for example, on the basis of an optical sensor, such as a camera, which detects the course of the road such that a direction of travel can be predicted.

In a preferred refinement of the means, the sensor system furthermore comprises a seat surface sensor which is assigned to a seat surface of the motorcycle and which is designed to, in an operating state of the device, detect a mass distribution on the seat surface and generate an associated seat measurement signal such that a predefined steering angle can be set at the steering device by way of the steering actuator in a manner dependent on the seat measurement signal. By means of such a seat sensor, the present and a predicted riding situation can be determined, because, on the basis of the generated seat measurement signal, the posture or inclination of the rider on the motorcycle can be inferred from the detected mass distribution on the seat surface.

If a mass distribution is detected of which the center of gravity is substantially centered in relation to the seat surface, a straight route section can be inferred, such that a steering angle of approximately zero degrees is set. By contrast, during cornering, the rider leans toward the center of the curve, such that, for example in the case of a left-hand curve, the center of gravity of the mass distribution is shifted to the left in relation to the direction of travel and a central point of the seat surface. In a manner corresponding to the inclination and the mass distribution, it is then for example the case that a steering angle of ten to twenty degrees is set by means of the steering actuator.

The seat surface sensor thus permits the determination of a seat occupancy on the saddle of a motorcycle. Furthermore, the means preferably comprises an inclination sensor which permits a measurement of an angle and a determination of an inclination of the motorcycle relative to a ground surface being traveled on. These sensors may for example be integrated in a sensor box of the motorcycle.

In a preferred refinement of the means, the steering actuator is designed as a linear actuator and is coupled to the steering device at a side arm of the latter. Alternatively or in addition, the steering actuator may be arranged as a motor in a steering-head bearing of the steering device. Furthermore, the means may also have more than one steering actuator, which steering actuators are each configured for setting a predefined steering angle at the steering device.

In one refinement of the means, the grip sensor is designed as a capacitive sensor. When there is contact or gripping contact on the grip element, a capacitance of the sensor changes measurably, such that it can be inferred that the rider is holding the steering device.

In one refinement, the means comprises a control unit which is coupled in terms of signal transmission to the steering actuator, to the grip sensor and, if present, to the seat surface sensor and which controls, in a manner dependent on a respective grip measurement signal and a seat measurement signal, setting of a predetermined steering angle at the steering device by way of the one or more steering actuators. For this purpose, the control unit comprises, for example, a processor unit and a data memory for the evaluation and processing of the data.

The device may further comprise an electromechanical throttle flap which enables the motorcycle to be controlled in terms of speed. Such a throttle flap is in particular already used in modern motorcycles. Furthermore, the device may comprise software which permits processing of the individual measurement signals and performs corresponding closed-loop control. For example, in the control unit of the means, there may be stored software which permits the execution of the corresponding commands and controls the receiving of the respective measurement signals and in particular the control of the one or more steering actuators.

According to a further aspect of the invention, a system comprises a motorcycle and an embodiment of the above-described means, which is arranged in or on the motorcycle. The means realizes in particular an advantageous steering system of the motorcycle, which contributes to a comfortable and safe operation of the motorcycle. By virtue of the system comprising an embodiment of the means described above, all features and characteristics of the means are also disclosed for the system and vice versa.

According to a further aspect of the invention, a method for operating a motorcycle by way of an embodiment of the means described above comprises determining external contact on the grip element by means of the grip sensor and generating an associated grip measurement signal. The method furthermore comprises activating the steering actuator in a manner dependent on the grip measurement signal from the grip sensor, and determining a riding situation by means of the sensor system of the motorcycle. Furthermore, the method comprises controlling the steering device of the motorcycle by setting of a predefined steering angle at the steering device by means of the steering actuator in a manner dependent on the grip measurement signal and the riding situation.

Such a method can, like the means, contribute to reliable and safe operation and to increased comfort of the motorcycle. By virtue of the fact that the rider can release the steering unit and the motorcycle is automatically controlled by the means, the rider can relax their hands and back, such that the described method can contribute to a pleasant and comfortable riding cycle. The activation of the steering system or of the steering actuator and control of the steering device of the motorcycle is performed when no external contact on the grip element is determined.

The determination of a riding situation may in particular comprise a detection of a mass distribution on the seat surface of the motorcycle by means of the seat surface sensor, which is arranged in or on the seat surface. A correspondingly generated seat measurement signal is representative of the detected mass distribution, such that control of the steering device of the motorcycle can be performed by setting of a predefined steering angle at the steering device by means of the steering actuator in a manner dependent on the seat measurement signal.

Furthermore, in one refinement, the method may comprise a determination of an attentiveness of a rider of the motorcycle in a manner dependent on the grip measurement signal of the grip sensor. Control of the steering device of the motorcycle may then also be performed for example by setting of a predefined steering angle at the steering device by means of the steering actuator in a manner dependent on the determined attentiveness of the rider.

The attentiveness of the rider may for example be determined by means of the grip sensor on the basis that contact on the steering device and on the respective grip element should occur at predefined time intervals. For example, a temporal threshold value is predefined, within which a contact-free grip element of the steering device is tolerable. Such a threshold value amounts to, for example, 30 seconds, such that, within this predefined time, the rider should touch the steering device and the respective grip element in order to confirm that they are attentive. If no contact on the grip element has occurred after expiry of the temporal threshold value, an alarm signal may for example be provided by means of the control unit, which alarm signal is output to the rider as a warning sound or as a flashing light. Alternatively or in addition, an electromechanical throttle flap of the motorcycle may be controlled by means of the control unit so as to reduce the speed of the motorcycle. Furthermore, detection of an attentiveness may also be performed by means of further sensors in or on the steering unit, for example by virtue of a head inclination of the rider being observed by means of a camera. If the rider directs their view to the left or to the right, or not toward the roadway, for too long, or inclines their head downward in the manner of a person who has fallen asleep, then insufficient attentiveness can be inferred.

The active steering system is activated by the rider of the motorcycle by releasing the one or more sensor-equipped grip elements while riding. The release is detected by means of the capacitive sensor in the respective grip element and is provided as a grip measurement signal to the control unit of the means. The steering task is then performed in automated fashion by means of the control unit. By means of the seat surface sensor in the saddle, the inclination of the hip of the rider is detected by means of the mass distribution, in particular to the left or to the right in relation to a direction of travel.

In the case of a neutral sitting position of the rider being determined, the motorcycle automatically maintains the straight-ahead direction of travel through activation of the steering actuator and predefining of a corresponding steering angle, and controls this in closed-loop fashion by means of the inclination sensor. Through control of the electromechanical throttle flap, the speed can likewise be automatically maintained. The predefining of the steering angle is thus preferably performed in a manner dependent on the sitting position of the rider. If the rider inclines their hip to the left or right, then the control unit activates the steering actuator and predefines a steering angle and thus correspondingly sets the handlebar position such that a change in the direction of travel to the left or to the right respectively occurs. In this way, even in the case of road sections which do not run ideally straight, the curve structure can be safely and reliably followed without the rider having to grip the steering unit and manually recorrect the riding line.

With the described means, the associated system and the corresponding method, it is possible to achieve automated lateral control of the motorcycle. In the case of particularly long journeys, the rider can relax their hands, in particular during straight-ahead travel. Furthermore, the possibility of briefly moving from the stooped posture to an upright posture serves to reduces back pain and wrist numbness and thus leads to an increased concentration of the rider, such that riding errors are counteracted and the risk of an accident owing to insufficient rider concentration is reduced. Correspondingly, the means, the system and the method can thus contribute to increased safety in road traffic.

With the inclination of the body, the rider can also make slight turns without having to place their hands on the grip elements of the steering unit. In this way, roads which are not ideally straight can be traveled along without problems. Furthermore, the steering system described can also be used to reduce the vibrations in the steering axis of the steering unit. Depending on the vibrations in the steering system, these can be compensated for or at least reduced by the predefining of an active steering moment by setting of a steering angle by means of the steering actuator. Thus, by the described means, an automated steering system for a motorcycle can be realized which can furthermore act as an active steering damper.

BRIEF DESCRIPTION OF THE DRAWINGS

Exemplary embodiments of the invention are explained in more detail below on the basis of the schematic drawings, in which.

DETAILED DESCRIPTION OF THE PREFERRED EMBODIMENTS

Elements of the same design or function are denoted by the same reference designations throughout the figures. For the sake of clarity, the illustrated elements may not be denoted by reference designations in all of the figures.

Figure 1:
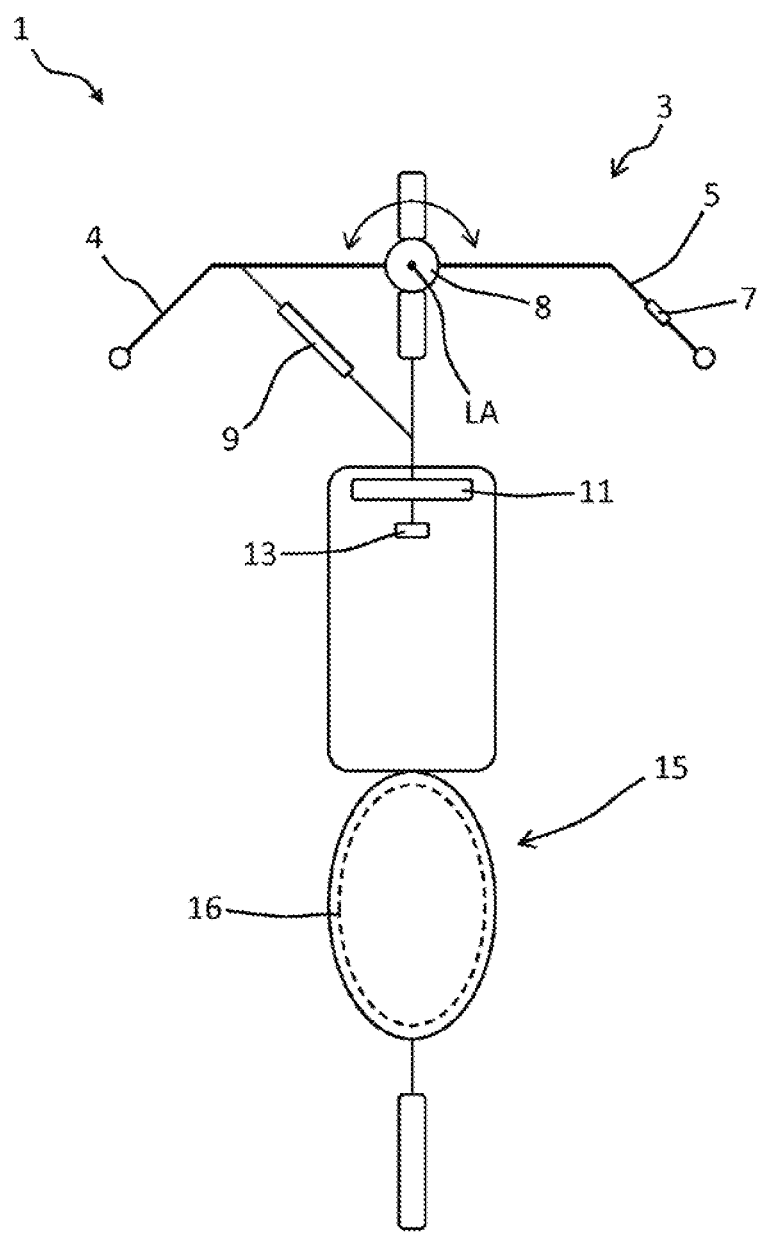
FIG. 1 shows a schematic exemplary embodiment of a system with a motorcycle.

FIG. 1 illustrates an exemplary embodiment of a system with a motorcycle 1 in a schematic plan view. The system furthermore has a means for operating the motorcycle 1, which means forms an active steering system of the motorcycle 1. The means comprises a steering device 3 with a first and a second grip element 4 and 5 and comprises a sensor system for detecting a riding situation, which sensor system comprises a grip sensor 7 which is arranged in or on one of the grip elements 4, 5. In the exemplary embodiment illustrated in FIG. 1, the grip sensor 7 is arranged on the right-hand grip element 5 in the plan view, which, for example, realizes a throttle grip of the motorcycle 1.

The grip sensor 7 is designed to, in an operating state of the means, detect external contact on the grip element 5 and generate an associated grip measurement signal. The means furthermore comprises a steering actuator 9 which is coupled to the steering device 3 for the purposes of setting a steering angle with respect to a steering axis LA, such that, in a manner dependent on the riding situation and the grip measurement signal, a predetermined steering angle can be set at the steering device 3 by way of the steering actuator 9. In the exemplary embodiment illustrated in FIG. 1, the steering actuator 9 is designed as a linear actuator and is coupled to a left-hand side arm of the steering device 3 as seen in the plan view.

Furthermore, the means has a closed-loop speed controller 13, which is designed for example as an electromechanical throttle flap, and a control unit 11, which controls a setting of a predefined steering angle and control of the steering device 3. For this purpose, the grip sensor 7 and the steering actuator 9 and also the closed-loop speed controller 13 are coupled in signal-transmitting fashion to the control unit 11. Furthermore, the means comprises a seat surface sensor 16, which is integrated in a seat surface 15 of the motorcycle 1 and which permits a detection of a mass distribution on the seat surface 15 and a generation of an associated seat measurement signal.

A setting of a predefined steering angle at the steering device 3 by means of the steering actuator 9 is performed preferably in a manner dependent on the seat measurement signal of the seat surface sensor 16, on the grip measurement signal of the grip sensor 7, which is designed for example as a capacitive sensor, and possibly also in a manner dependent on a measurement signal of an inclination sensor, which permits a measurement of an angle and a determination of an inclination of the motorcycle 1 relative to a ground surface being traveled on. On the basis of the seat surface sensor 16 and the inclination sensor, a present and a predicted riding situation can be determined, which is also processed by the control unit 11 in the setting of a predefined steering angle.

Figure 2:
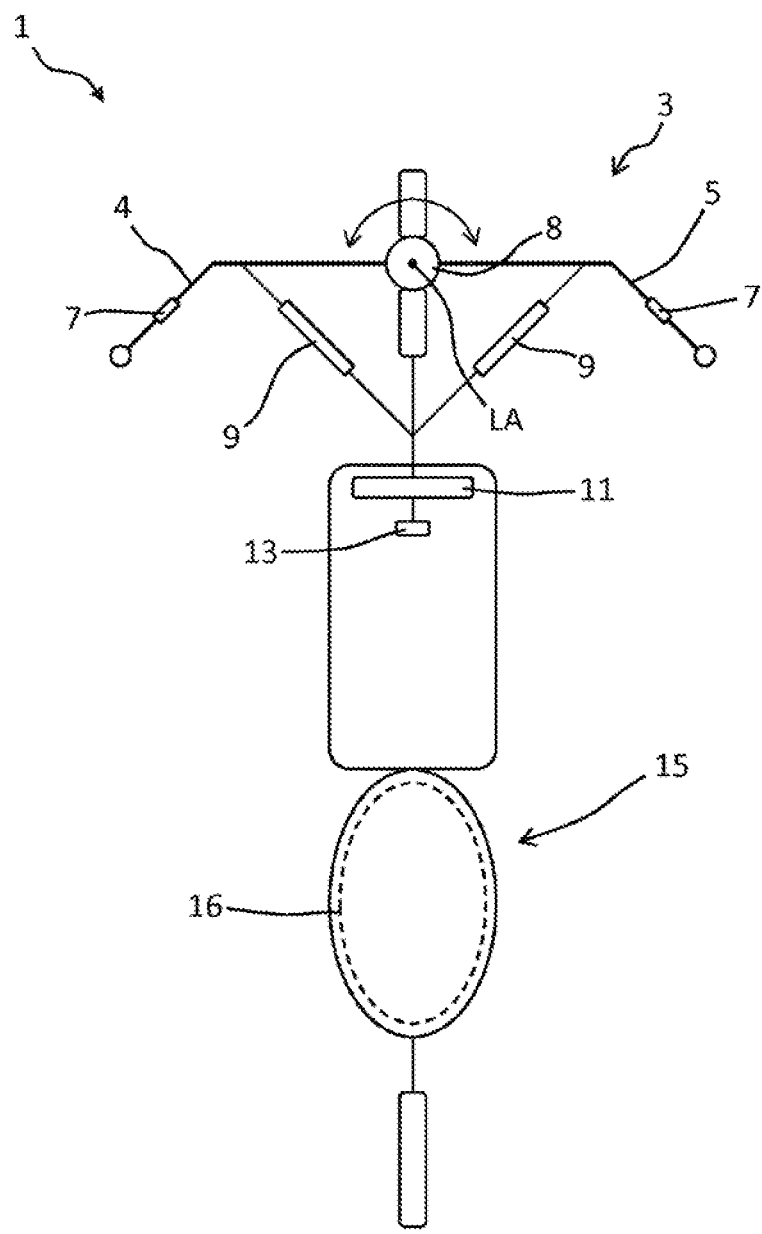
FIG. 2 shows a further schematic exemplary embodiment of the system with a motorcycle.

FIG. 2 illustrates a further exemplary embodiment of the motorcycle 1 in a schematic plan view, in which, by contrast to FIG. 1, the means has a further grip sensor 7 in or on the left-hand grip element 4 and a further steering actuator 9 in the form of a linear actuator, which is coupled to the right-hand side arm of the steering device 3. In this way, a particularly reliable determination of gripping contact or contact of a hand of a rider on the steering device 3, and safe and stable control of the steering device by setting of a respective steering angle by means of the associated steering actuator 9, can be performed.

Figure 3:
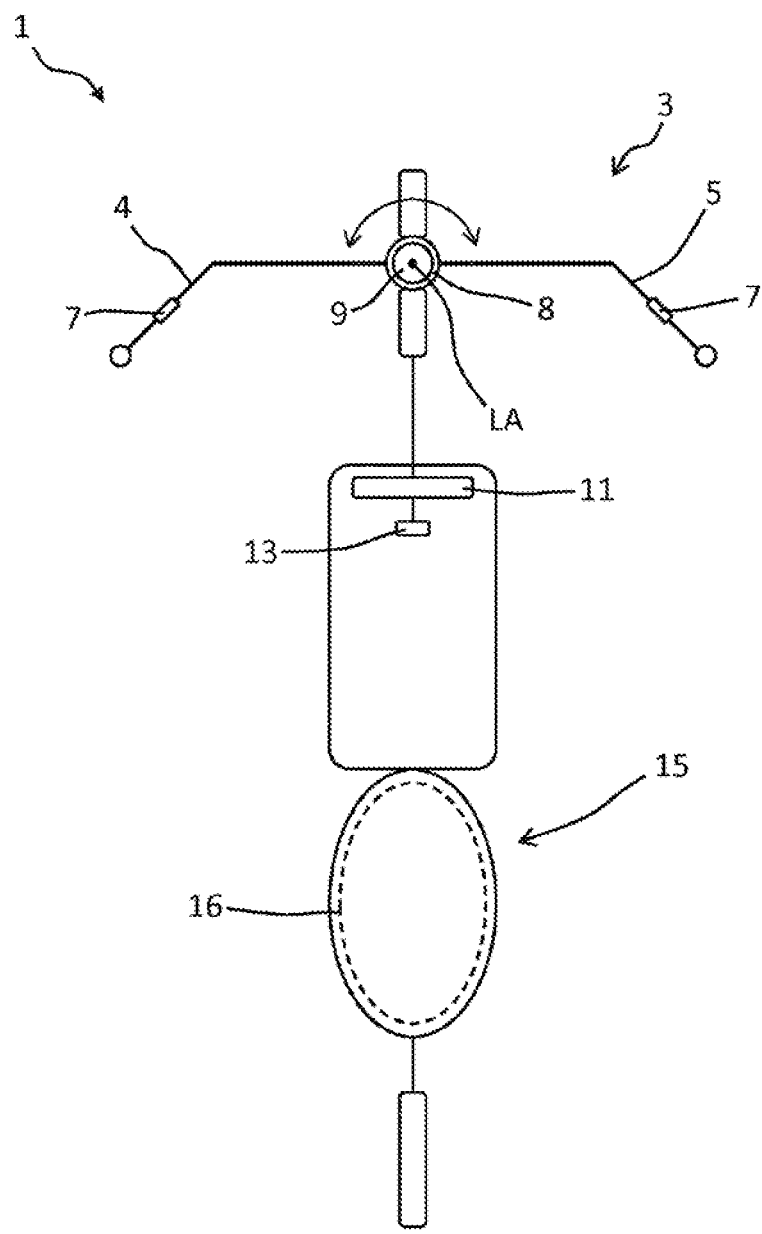
FIG. 3 shows a further schematic exemplary embodiment of the system with a motorcycle.

FIG. 3 illustrates a further exemplary embodiment of the motorcycle 1 in a schematic plan view, in which, by contrast to FIGS. 1 and 2, the means has a steering actuator 9 in the form of a drive or motor, which is arranged in a steering-head bearing 8 of the motorcycle 1. In further embodiments of the means, it is also possible, in addition to a motor arranged in the steering-head bearing 8, for one or more linear actuators to be provided in order to permit particularly safe and reliable control of the steering device 3.

Figure 4:
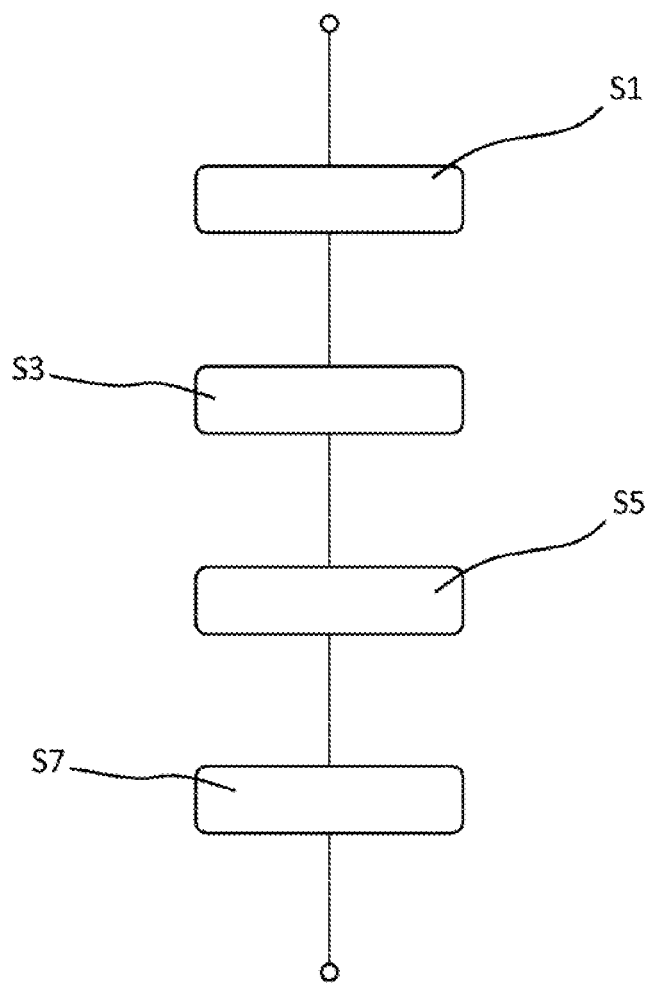
FIG. 4 shows a schematic flow diagram for methods for operating a motorcycle.

The respective steering actuator 9 is designed to impart an active steering moment about the steering axis LA in order to set a desired steering angle. The steering actuator 9 may for example be designed as an electromechanical actuator, wherein an energy supply may be implemented via a vehicle electrical system of the motorcycle 1. For the control of the steering device 3 by means of the control unit 11 and of the one or more steering actuators 9, the means has software with executable commands, which permits a method for operating the motorcycle 1 in accordance with the flow diagram illustrated in FIG. 4, and automatic closed-loop control of the steering system.

In a step S1, on the basis of the one or more grip sensors 7, it is determined whether there is contact on the respective grip element 4, 5, and an associated grip measurement signal is generated.

In the event that the rider of the motorcycle 1 releases the sensor-equipped grip elements 4, 5, and it is consequently determined that there is no contact on the respective grip element 4, 5, then the steering system realized by the means is activated in a step S3.

In a further step S5, the steering task is now performed in automated fashion in that, by means of the control unit 11, the one or more steering actuators 9 are activated in targeted fashion and thus a predefined steering angle of the steering device 3 in relation to the steering axis LA is set. Here, by means of the seat surface sensor 16 in the saddle of the motorcycle 1, the inclination of the hip of the rider is detected by means of the left/right mass distribution. In the case of a neutral sitting position, it is for example the case that a steering angle of approximately zero degrees is set in relation to a direction of travel, such that the motorcycle 1 automatically maintains the straight-ahead direction of travel. On the basis of the inclination sensor, the setting of the steering angle can be verified and, by means of control of the closed-loop speed controller 13, a speed of the motorcycle 1 can be automatically maintained or adapted.

The predefining of the steering angle is performed in particular in a manner dependent on the sitting position of the rider. In a further step S7, an inclination of the rider may thus be determined if said rider has shifted their weight to the left or to the right, such that, by means of the control unit 11, the respective steering actuator 9 is activated and the steering device 3 is oriented. In this way, a change in the direction of travel to the left or right can be initiated, such that, even in the case of road sections which do not run ideally straight, the curve structure can be followed without the need for the rider to reach forward to a grip element 4, 5 and manually recorrect the riding line.

The active steering system is activated by the rider of the motorcycle 1 by releasing the one or more sensor-equipped grip elements 4, 5 while riding. The release is detected by means of the respective grip sensor 7 in the respective grip element 4, 5 and is provided as a grip measurement signal to the control unit 11 of the means. With the inclination of the body, the rider can thus make turns without having to place their hands on the grip elements 4, 5 of the steering unit 3. A predefining of the steering angle is thus performed in a manner dependent on the sitting position of the rider.

With the described means, the associated system and the corresponding method, it is possible to achieve automated lateral control of the motorcycle 1. In the case of particularly long journeys, the rider can thus relax their hands, in particular during straight-ahead travel. Furthermore, the possibility of briefly moving from the stooped posture to an upright posture serves to reduces back pain and wrist numbness and thus leads to an improved concentration of the rider, such that riding errors are counteracted and the risk of an accident owing to insufficient rider concentration is reduced. Correspondingly, the means, the system and the method can thus contribute to increased safety in road traffic.

LIST OF REFERENCE SIGNS

1 Motorcycle
3 Steering device of the motorcycle
4 First grip element of the steering device
5 Second grip element of the steering device
7 Grip sensor
8 Steering-head bearing of the steering device
9 Steering actuator
11 Control unit of the motorcycle
13 Closed-loop speed controller of the motorcycle
15 Seat surface of the motorcycle
16 Seat surface sensor of the motorcycle
LA Steering axis of the handlebar
S(i) Respective step of a method for reconstruction of a roadworks site for a motor vehicle

The invention claimed is:

1. A means for operating a motorcycle, comprising:
a steering device with a first and a second grip element;
a sensor system for detecting a riding situation, which sensor system comprises a grip sensor which is arranged in or on one of the grip elements and which is designed to, in an operating state of the means, detect external contact on the respective grip element by a rider of the motorcycle and generate an associated grip measurement signal;
a seat surface sensor which is assigned to a seat surface of the motorcycle and which is designed to, in the operating state of the means, detect a mass distribution of the rider on the seat surface and generate an associated seat measurement signal; and
a steering actuator which is coupled to the steering device for the purposes of setting a steering angle with respect to a steering axis,
wherein when the associated grip measurement signal indicates that the sensor system does not detect the external contact on the respective grip element by the rider, the steering actuator is activated to control the steering angle according to the associated seat measurement signal, such that the steering actuator steers the motorcycle according to the mass distribution of the rider on the seat surface.

2. The means as claimed in claim 1, wherein a predefined steering angle can be set at the steering device by way of the steering actuator in a manner dependent on the seat measurement signal.

3. The means as claimed in claim 1, wherein the steering actuator is designed as a linear actuator and is coupled to a side arm of the steering device.

4. The means as claimed in claim 1, wherein the steering actuator is arranged as a drive in a steering-head bearing of the steering device.

5. The means as claimed in claim 1, wherein the grip sensor is designed as a capacitive sensor.

6. The means as claimed in claim 2, comprising:
a control device which is coupled in terms of signal transmission to the steering actuator, to the grip sensor and, to the seat surface sensor and which is configured to, in a manner dependent on a respective grip measurement signal and, in a manner dependent on a seat measurement signal, set a predetermined steering angle at the steering device by way of the steering actuator.

7. The means as claimed in claim 1, wherein a predefined steering angle can be set at the steering device by way of the steering actuator if the respective grip element is free from external contact.

8. A system comprising:
a motorcycle, and
a means for operating the motorcycle as claimed in claim 1, which means is arranged in or on the motorcycle.

9. A method for operating a motorcycle by a means as claimed in claim 1, comprising:
determining external contact on the grip element by the grip sensor and generating an associated grip measurement signal,
activating the steering actuator in a manner dependent on the grip measurement signal from the grip sensor,
determining the riding situation by the sensor system of the motorcycle, and controlling the steering device of the motorcycle by setting a predefined steering angle at the steering device by the steering actuator in a manner dependent on the riding situation and the grip measurement signal of the grip sensor.

10. The method as claimed in claim 9, in which the determination of the riding situation comprises:
detecting a mass distribution on a seat surface of the motorcycle by a seat surface sensor, which is arranged in or on the seat surface, and generating an associated seat measurement signal, and
controlling the steering device of the motorcycle by setting a predefined steering angle at the steering device by the steering actuator in a manner dependent on the seat measurement signal.

11. The method as claimed in claim 9, wherein the activation of the steering actuator and control of the steering device of the motorcycle is performed in a manner dependent on the grip measurement signal from the grip sensor if no external contact on the grip element is determined.

12. The method as claimed in claim 9, in which the determination of the riding situation comprises:
determining an attentiveness of a rider of the motorcycle in a manner dependent on the grip measurement signal of the grip sensor, and
controlling the steering device of the motorcycle by setting a predefined steering angle at the steering device by the steering actuator in a manner dependent on the determined attentiveness of the rider.

13. The means as claimed in claim 2, wherein the steering actuator is designed as a linear actuator and is coupled to a side arm of the steering device.

14. The method as claimed in claim 10, wherein the activation of the steering actuator and control of the steering device of the motorcycle is performed in a manner dependent on the grip measurement signal from the grip sensor if no external contact on the grip element is determined.

* * * * *